UNITED STATES PATENT OFFICE 2,180,220

CATALYST REGENERATION

George A. Boyd, Chicago, Ill., assignor to Standard Oil Company, Chicago, Ill., a corporation of Indiana No Drawing. Application October 13, 1937, Serial No. 168,797

13 Claims. (Cl. 196—54)

This invention relates to catalyst regeneration and it pertains more particularly to the regeneration of aluminum chloride catalysts used in organic synthesis and in the refining of mineral oils.

It is known that aluminum chloride may act as a catalyst to effect cracking, isomerization, alkylation, polymerization, reforming, etc. Heavy oils have been treated with aluminum chloride to remove reactive and deleterious components therefrom. Light oils have been treated with aluminum chloride to effect cracking and the production of high quality motor fuel. Mixtures of petroleum gases and liquids have been reacted with aluminum chloride to effect chemical combination (alkylation). Normal paraffinic hydrocarbons have been treated with aluminum chloride to produce iso-paraffins of lower molecular weight. Olefins and halogenated hydrocarbons have been chemically combined with alkyl and aromatic compounds to give synthetic oils, resins, etc. In practically all of these cases an aluminum chloride sludge is obtained during the reaction. After a period of time, varying from a few minutes to several hours or days, the catalyst evidently forms complex compounds with the materials undergoing treatment, and its catalytic activity is diminished or stopped. This complex aluminum organic sludge varies from black tarry matter to light red oils and the chemical structure of the complexes defies analysis. When these red oils or sludges are formed and the catalytic action is nullified, the catalyst must either be replaced or regenerated. If it is replaced the cost may render the process prohibitive from an economic standpoint. The object of my invention is to provide a new and improved method of regenerating such catalysts, both during their use and after their efficiency has rendered their further use ineffective.

In practicing my invention I employ carbon monoxide gas, either alone or in admixture with one or more promoters such as halogens, organic halides and halide acids, water, ammonia, etc. In catalytic reactions, where the gases or liquids are passed through a catalyst mass, or otherwise continuously contacted therewith, the carbon monoxide, either with or without catalyst promoters, may be continuously passed over or through the catalyst with the material undergoing treatment, thus continuously regenerating the catalyst and markedly extending its active life. In batch treatments or in those cases where continuous regeneration is impractical, the spent catalyst complex (red oil, sludge, etc.) is preferably withdrawn from the system for separate regeneration.

I am unable to give any definite explanation as to why or how the carbon monoxide acts on the spent catalyst, but it is my theory that the red oils and sludges are organic aluminum compounds which can be split with carbon monoxide into hydrocarbons, oxygenated organic materials and simple aluminum chloride. I prefer to effect this regeneration in the presence of chlorine, organic chlorides or HCl, since these gases appear to promote the regeneration of catalyst by removal of the complex organic materials (which may be hydrocarbons, ketones, aldehydes, acid, alcohols or mixtures thereof). It should be understood that my invention is also applicable to the regeneration of other catalytic halide catalysts.

As a preferred example of my invention I will describe an isomerization reaction wherein a normal paraffin such as heptane is converted into iso-paraffins such as iso-butane, iso-pentane, etc., this reaction leading to the production of a red oil aluminum complex which may be regenerated with carbon monoxide and HCl in accordance with my invention.

About 2735 parts by weight of normal heptane are treated with 281 parts of anhydrous aluminum chloride which, during the course of the reaction, is activated by 232 parts by weight of HCl, the reaction being extended for a period of 10 hours at a temperature of about 150° F., with constant stirring. The aluminum chloride and normal heptane are placed in a reactor and brought up to reaction temperature and the HCl is bubbled up slowly through the reactants as the reaction proceeds. This results in the production of 1127 parts by weight of condensible gases, 1171 parts by weight of a water-white upper liquid layer and 254 parts by weight of a lower layer red oil. This analysis of the product shows almost 60% iso-butanes over 13% of iso-pentane with about 25% of normally liquid hydrocarbons, the balance consisting of the so-called "red oil". This complex red oil contains only about 1.4% by weight of chlorine and it has practically no further catalytic action unless it is regenerated.

The red oil as hereinabove produced is withdrawn to a separate treating vessel, heated to a temperature about 150 to 160° F. and is then blown with carbon monoxide gas. Instead of blowing with carbon monoxide alone I may also blow with a mixture of carbon monoxide and hydrogen, the hydrogen being present in amounts up to as much as 3 parts hydrogen to one part carbon monoxide. While a treating temperature of about 150 to 160° F. is preferred, it should be understood that this treating temperature may vary from about room temperature to about 400 to 500° F., the optimum treating temperature for any particular complex being determined by simple preliminary tests. The oxygenated organic compounds or hydrocarbon products which are split from the aluminum chloride in this carbon monoxide treatment may be removed from said aluminum chloride by distillation, or if desired the regenerated catalyst may be re-used without the separation of the CO reaction products. Alternatively, HCl, Cl₂ or other promoter and carbon monoxide may be simultaneously bubbled through the red oil to effect the destruction of the complex and the regeneration of the catalytic action of the aluminum chloride.

In aluminum chloride reactions wherein vaporized hydrocarbons are passed over or contacted with aluminum chloride to effect isomerization or reforming it may sometimes be possible to inject small amounts of carbon monoxide into the reaction mixture so that the red oil or aluminum complex may be broken down as fast as it is formed. This, of course, may lead to the contamination of the end products with oxygenated compounds, but they may be removed from the hydrocarbons in subsequent treatments by suitable solvents, scrubbing liquids, adsorbents or chemical reagents. Similarly, mixtures of carbon monoxide and hydrogen may be injected into the feed stock undergoing aluminum chloride treatment, the reducing action of the hydrogen tending to supplement and augment the regenerating action of the carbon monoxide. Small amounts of promoters such as chlorine, HCl, carbon tetra chloride, or other halogens, organic halides or halide acids may be used to promote, modify or augment the carbon monoxide regeneration of the aluminum chloride catalyst, and thereby tend to increase the catalytic effectiveness and catalyst life.

While I have described in detail a preferred embodiment of my invention it should be understood that I do not limit myself to such detail except as defined by the following claims which should be construed as broadly as the prior art will permit.

I claim:

1. The method of breaking down an organic aluminum chloride complex formed by the reaction of an aluminum chloride catalyst with a hydrocarbon oil, which method comprises treating said complex with carbon monoxide and a promoter at a temperature above room temperature and below 500° F.

2. The method of claim 1 wherein the promoter is hydrogen.

3. The method of claim 1 wherein the promortor is a halide acid.

4. The method of claim 1 wherein the promoter is a halogen.

5. The method of breaking down an organic aluminum chloride complex formed by the reaction of an aluminum chloride catalyst with a hydrocarbon oil, which method comprises treating said complex with carbon monoxide and a halogen at a temperature above room temperature and below 500° F., and wherein said halogen is introduced as a constituent of an organic halide.

6. The method of breaking down an organic aluminum chloride complex formed by the reaction of an aluminum chloride catalyst with a hydrocarbon oil, which method comprises treating said complex with carbon monoxide and hydrochloric acid at a temperature above room temperature and below 500° F.

7. The method of breaking down an organic aluminum chloride complex formed by the reaction of an aluminum chloride catalyst with a hydrocarbon oil, which method comprises treating said complex with carbon monoxide and chlorine at a temperature above room temperature and below 500° F.

8. The method of claim 1 wherein said complex is treated simultaneously with the reaction of aluminum chloride catalyst with the hydrocarbon oil.

9. The method of breaking down an aluminum chloride complex formed by the reaction of an aluminum chloride catalyst with a hydrocarbon oil, which method comprises treating said complex with carbon monoxide and hydrogen at a temperature above room temperature and below 500° F. simultaneously with the reaction of the aluminum chloride catalyst with the hydrocarbon oil.

10. The method of breaking down an organic aluminum chloride complex formed by the reaction of an aluminum chloride catalyst with the hydrocarbon oil, which method comprises treating said complex with carbon monoxide and chlorine at a temperature above room temperature and below 500° F. simultaneously with the reaction of the aluminum chloride on the hydrocarbon oil.

11. The method of breaking down an organic aluminum chloride complex formed by the reaction of an aluminum chloride catalyst with the hydrocarbon oil, which method comprises treating said complex with carbon monoxide and hydrochloric acid at a temperature above room temperature and below 500° F. simultaneously with the reaction of the aluminum chloride catalyst with the hydrocarbon oil.

12. The method of breaking down an organic aluminum chloride complex formed by the reaction of an aluminum chloride catalyst with the hydrocarbon oil, which method comprises treating said complex with carbon monoxide and a halogen at a temperature above room temperature and below 500° F. simultaneously with the reaction of the aluminum chloride catalyst with the hydrocarbon oil.

13. The method of claim 1 wherein the temperature is about 150 to 160° F.

GEORGE A. BOYD.